United States Patent
Gaudet

(10) Patent No.: US 8,098,655 B1
(45) Date of Patent: *Jan. 17, 2012

(54) **SYSTEMS AND METHODS FOR CONVERTING A *P* PACKET/CYCLE DATAPATH TO A *Q* PACKET/CYCLE DATAPATH**

(75) Inventor: Brian Gaudet, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 12/506,910

(22) Filed: Jul. 21, 2009

Related U.S. Application Data

(63) Continuation of application No. 11/458,809, filed on Jul. 20, 2006, now Pat. No. 7,583,663, which is a continuation of application No. 09/895,218, filed on Jul. 2, 2001, now Pat. No. 7,103,038.

(51) Int. Cl.
*H04L 12/50* (2006.01)
*H04L 12/56* (2006.01)
*H04L 12/54* (2006.01)
*G06F 13/00* (2006.01)
*G06F 7/38* (2006.01)

(52) U.S. Cl. ........ 370/366; 370/412; 370/428; 711/109; 712/225

(58) Field of Classification Search ................. 370/366, 370/394, 473, 503–520, 535–540, 412–428; 711/109, 202, 219; 712/225

See application file for complete search history.

(56) References Cited

U.S. PATENT DOCUMENTS

| | | | |
|---|---|---|---|
| 4,556,850 A | 12/1985 | McBrien | |
| 4,907,225 A | 3/1990 | Gulick et al. | |
| 5,081,654 A * | 1/1992 | Stephenson et al. | 375/368 |
| 5,133,078 A * | 7/1992 | Minassian et al. | 710/52 |
| 5,220,325 A | 6/1993 | Ackland et al. | |
| 5,365,519 A | 11/1994 | Kozaki et al. | |
| 5,381,409 A | 1/1995 | Folkert de Vries | |
| 5,768,630 A | 6/1998 | Kim | |
| 5,790,786 A | 8/1998 | Wakeman et al. | |
| 6,285,726 B1 * | 9/2001 | Gaudet | 375/376 |
| 6,356,561 B1 * | 3/2002 | Lau et al. | 370/462 |
| 6,385,671 B1 | 5/2002 | Hunsaker et al. | |
| 6,421,348 B1 | 7/2002 | Gaudet et al. | |
| 6,509,851 B1 | 1/2003 | Clark et al. | |
| 6,650,638 B1 | 11/2003 | Walker et al. | |
| 7,082,104 B2 * | 7/2006 | Wolrich et al. | 370/236 |
| 7,103,038 B1 | 9/2006 | Gaudet | |
| 7,230,957 B2 * | 6/2007 | Kang et al. | 370/535 |
| 7,583,663 B1 | 9/2009 | Gaudet | |
| 2001/0012290 A1 | 8/2001 | Kanazashi | |
| 2002/0176449 A1 * | 11/2002 | Trippe | 370/505 |
| 2003/0079118 A1 * | 4/2003 | Chow | 712/300 |

* cited by examiner

*Primary Examiner* — Tri H Phan
(74) *Attorney, Agent, or Firm* — Harrity & Harrity, LLP

(57) ABSTRACT

A system includes a queue that stores P data units, each data unit including multiple bytes. The system further includes a control unit that shifts, byte by byte, Q data units from the queue during a first system clock cycle, where Q<P, and sends, during the first system clock cycle, the Q data units to a processing device configured to process a maximum of Q data units per system clock cycle.

20 Claims, 4 Drawing Sheets

SYSTEMS AND METHODS FOR CONVERTING A P PACKET/CYCLE DATAPATH TO A Q PACKET/CYCLE DATAPATH

CROSS REFERENCE TO RELATED APPLICATION

The present application is a continuation of U.S. application Ser. No. 11/458,809 filed Jul. 20, 2006, which is a continuation of U.S. application Ser. No. 09/895,218, filed Jul. 2, 2001, the disclosures of which are incorporated by reference herein in their entirety.

BACKGROUND OF THE INVENTION

A. Field of the Invention

The present invention relates generally to packet processing and, more particularly, to converting a first data path that carries up to P packets per processing cycle to a second data path that carries Q packets per processing cycle, where Q<P.

B. Description of Related Art

Packet processing systems, including any type of router, server or host that communicates using a packet-switching access mechanism, conventionally receive and process multiple packets in a single system cycle. A packet processing system may include a wide data path for receiving multiple packets in parallel during a single system cycle. Processing the packets at the rate they are received may require multiple instances of processing logic operating in parallel. If the packet processing system receive data path is N bytes wide, and the minimum packet that must be processed is M bytes, then P=N/M instances of the processing logic may be required to process all packets in a given system cycle. For example, conventional Cyclical Redundancy Checking (CRC) may be performed to determine packet data errors.

Multiple instances of processing logic in the packet processing system, however, may have many drawbacks, such as increased power demands and space requirements in the system. In Application Specific Integrated Circuits (ASICs), for example, multiple instances of processing logic utilize valuable area of the ASIC. Multiple elements operating in parallel also increase timing complexity in the system.

To decrease space and power requirements in the packet processing system, it would, thus, be desirable to reduce the instances of the logic required to process multiple packets received during a single system cycle. For example, reduction of the processing logic to, for example, a single instance would significantly reduce space and power requirements. Therefore, to enable the use of a single instance of packet processing logic, there exists a need for systems and methods that can convert a data path carrying P packets per cycle to a data path that carries only Q packets per cycle, such as Q=1 packet per cycle.

SUMMARY OF THE INVENTION

Consistent with the principles of the invention disclosed and claimed herein, these and other needs are addressed by queuing up to P packets per cycle received on a first data path and outputting Q packets per cycle on a second data path, where Q<P. Thus, in one embodiment, the packet processing system may use only a single instance of processing logic, such as, for example, CRC logic to process the P packets.

According to one aspect, a method may include storing P data units, each comprising multiple bytes, in a queue. The method may further include shifting, byte by byte, Q data units from the queue during a first system clock cycle, wherein Q<P and sending, during the first system clock cycle, the Q data units to a processing device configured to process a maximum of Q data units per system clock cycle.

According to another aspect, a system may include a queue that stores P data units, each data unit including multiple bytes. The system may further include a control unit that shifts, byte by byte, Q data units from the queue during a first system clock cycle, wherein Q<P, and sends, during the first system clock cycle, the Q data units to a processing device configured to process a maximum of Q data units per system clock cycle.

According to an additional aspect, a system may include a queue configured to receive and store first P packets during a first system clock cycle and a processing device configured to process a maximum of Q packets per system clock cycle. The system may further include a control unit configured to selectively retrieve first Q packets of the first P packets from the queue during the first system cycle, wherein Q<P, and send the Q packets to the processing device for processing during a single system clock cycle.

According to yet another aspect, a system may include a clock device configured to produce clock signals having a system clock cycle, a data path configured to carry a maximum of P data units per system clock cycle and a data processing device configured to process a maximum of Q data units per system clock cycle. The system may further include one or more devices connected to the data path and the data processing device and configured to receive P data units from the data path during a first system clock cycle, and supply, during the first system clock cycle, first Q data units of the P data units to the data processing device for processing, wherein Q<P.

According to a further aspect, a method may include receiving P data units during a first system clock cycle, where each of the P data units includes multiple bytes, and storing the P data units in a queue. The method may further include selectively retrieving bytes of the P data units from the queue until Q data units have been retrieved, where Q<P, and sending, during the first system clock cycle, the Q data units to a data processing device capable of handling a maximum of Q data units per clock cycle.

According to another aspect, a system may include a queue configured to receive P data units during a first system clock cycle, where each of the P data units includes multiple bytes, and store the P data units. The system may further include a control unit configured to selectively retrieve bytes of the P data units from the queue until Q data units have been retrieved, where Q<P, and send, during the first system clock cycle, the Q data units to a data processing device capable of handling a maximum of Q data units per clock cycle.

BRIEF DESCRIPTION OF THE DRAWINGS

The accompanying drawings, which are incorporated in and constitute a part of this specification, illustrates an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide mechanisms that can queue up to P packets per cycle received on a first data path and output Q packets per cycle on a second data path, wherein Q<P. In one embodiment, Q=1, thus, enabling the use of a single instance of packet processing logic to process the received P packets.

Exemplary Packet Processing System

Figure 1:
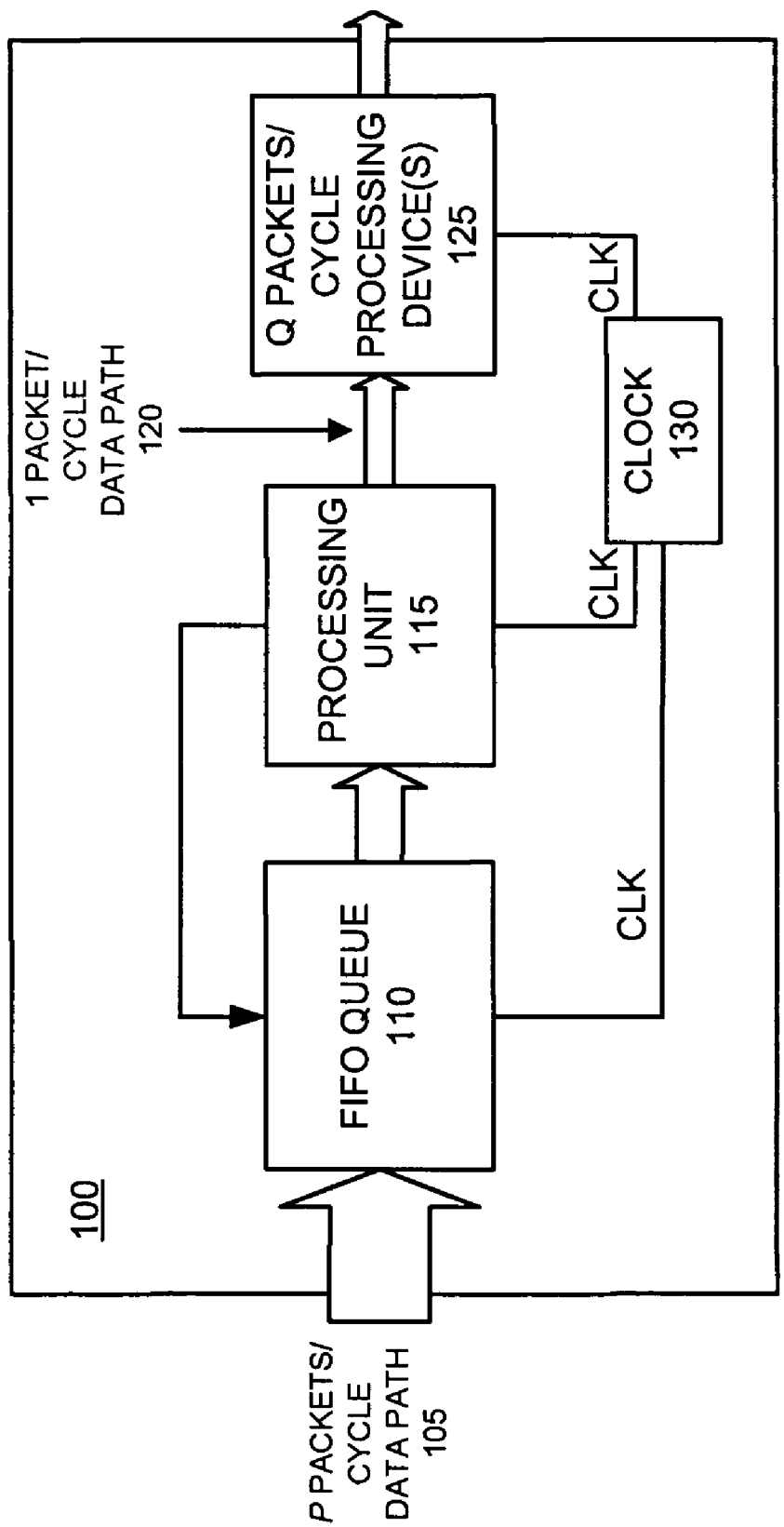
FIG. 1 is an exemplary diagram of a packet processing system consistent with the principles of the invention.

FIG. 1 is a diagram of an exemplary packet processing system 100 that converts a data path that may carry up to P packets per processing cycle to a data path that carries Q packets, such as a single packet, per processing cycle. Packet processing system 100 may reside in, or be connected to, any device that receives or transmits packet data, such as a packet router, a bridge, a switch fabric, or any server or host that handles packets.

Packet processing system 100 may include a data path 105, a FIFO queue 110, a processing unit 115, a data path 120, a processing device(s) 125, and a clock 130. Data path 105 may be N data units, such as N bytes, in width and may include conventional mechanisms for receiving up to P packets per processing cycle and for transmitting the received packets to FIFO queue 110. FIFO queue 110 can receive and store packets received from data path 105 and may include one or more memory devices (not shown).

Processing unit 115 may include a processor that contains instructions for processing data received from FIFO queue 110. Processing unit 115 may alternatively include logic circuitry that performs the equivalent functions of a processor. Processing unit 115 also may include flow control feedback to FIFO queue 110.

Processing device(s) 125 may include a device that processes up to Q incoming packets per processing cycle. For example, processing device(s) 125 may include a Cyclical Redundancy Check (CRC) unit that performs conventional CRC data error checks upon packets received via data path 105. Processing device(s) 125 may also include multiple devices that can each process a maximum of Q packets per cycle, where each of the multiple devices may perform different functions. For example, processing device(s) 125 may include a checksum unit, a CRC unit and a FIFO unit, with each unit processing a maximum of Q packets/cycle, such as 1 packet/cycle.

Clock 130 includes conventional circuitry for supplying clock signals to the components of packet processing system 100. Clock 130 may, for example, supply a clock signal to FIFO queue 110, processing unit 115, and processing device(s) 125.

Exemplary FIFO Queue and Processing Unit

Figure 2:
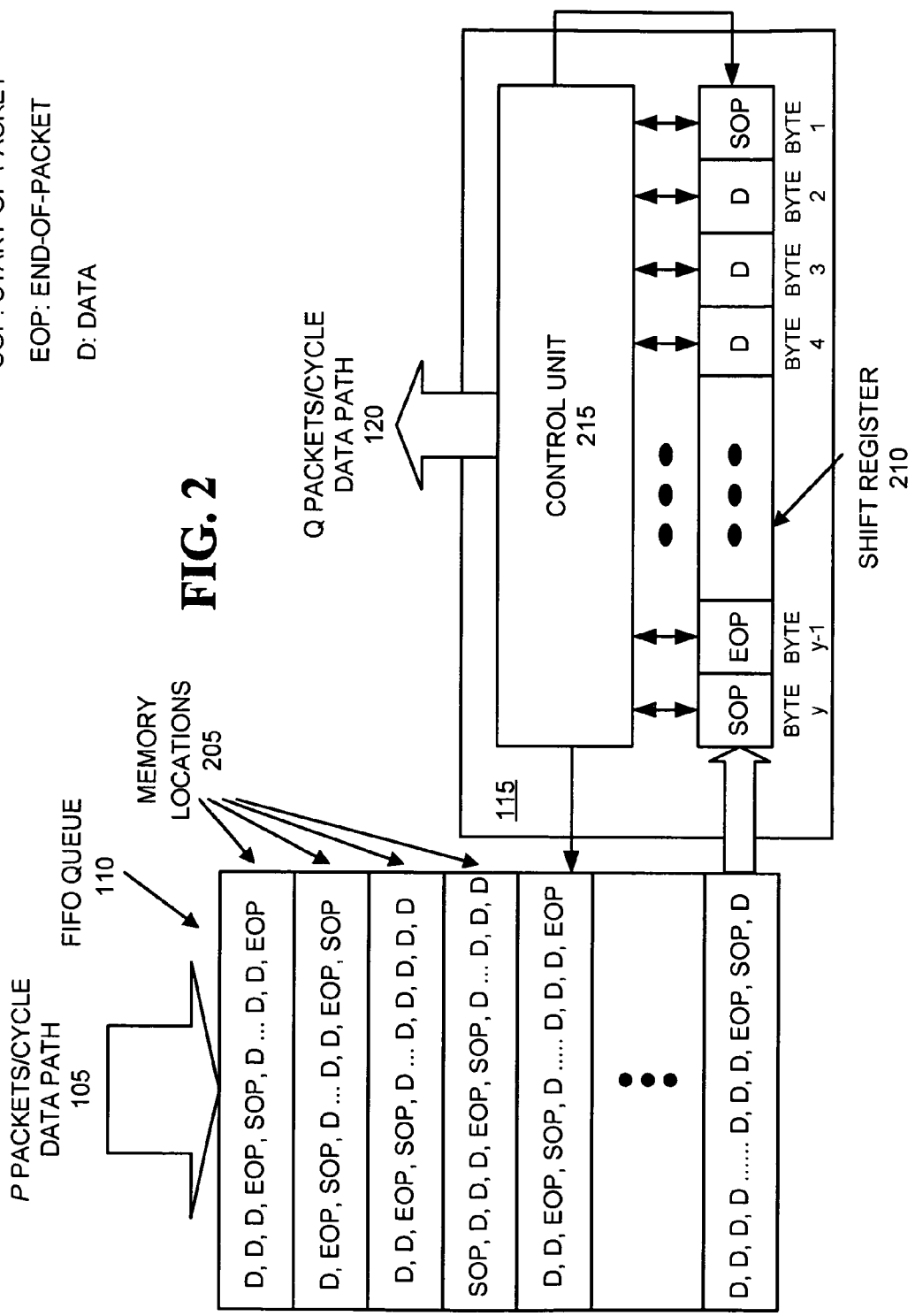
FIG. 2 is an exemplary diagram of the First-in-First-Out (FIFO) queue and processing unit of FIG. 1 according to an implementation consistent with the principles of the invention.

FIG. 2 illustrates exemplary components of FIFO queue 110 and processing unit 115 according to an implementation consistent with the principles of the present invention. FIFO queue 110 may include memory locations 205 for storing bytes of packets received via data path 105. Processing unit 115 may include a shift register 210 and a control unit 215. Shift register 210 may include memory storage units that can right shift individual data units from FIFO queue 110 into shift register 210. Shift register 210 may include memory storage units for storing y data units. Control unit 215 may include a processing device that can retrieve data units from shift register 210 and pass individual packets, composed of the retrieved data units, on data path 120. Control unit 215 may alternatively include logic circuitry that performs the equivalent functions of a processing device.

Exemplary Packet Processing

Figure 3:
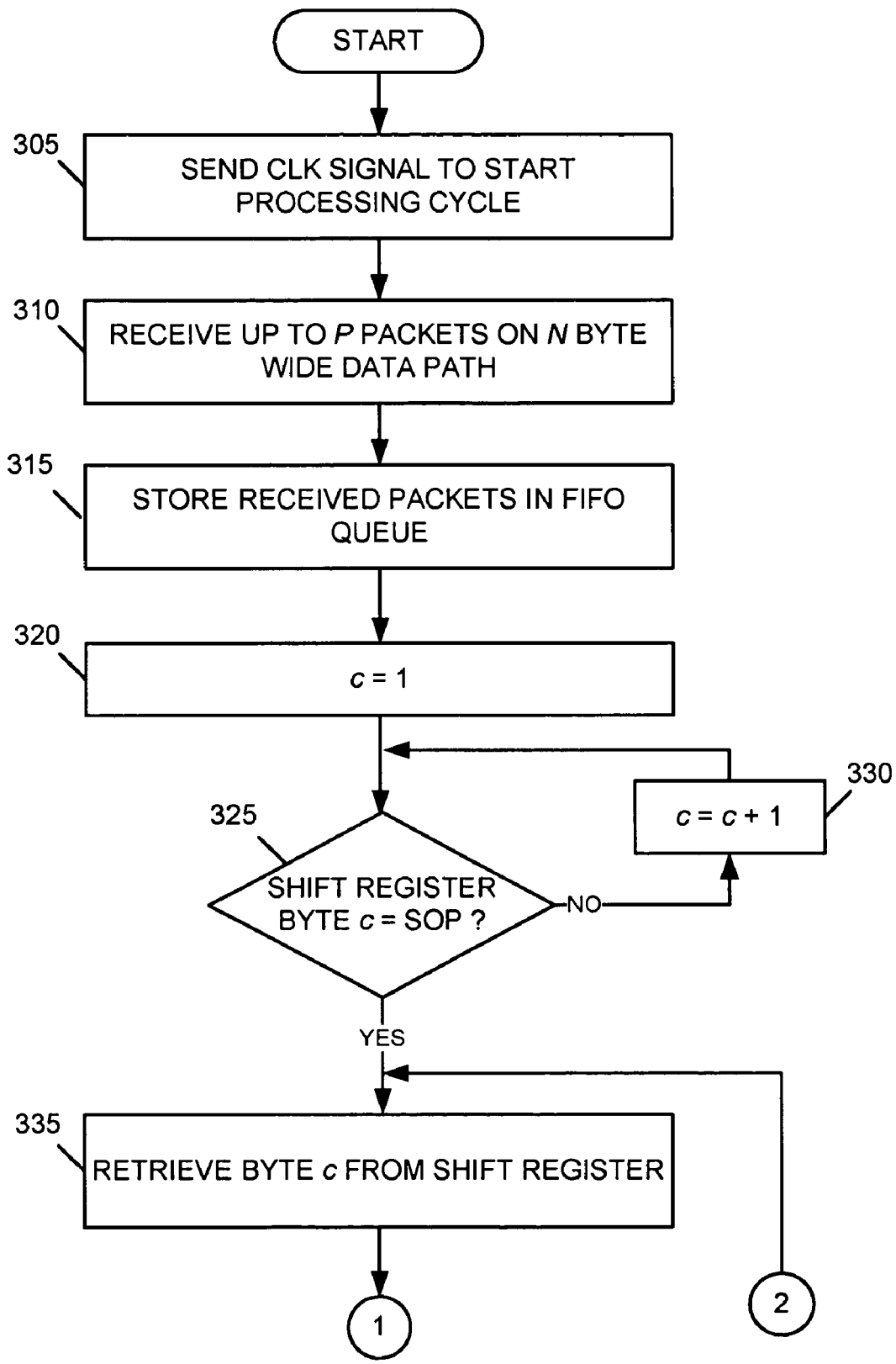
FIGS. 3-4 are exemplary flowcharts of processing by the packet processing system of FIG. 1 according to an implementation consistent with the principles of the invention.
Figure 4:
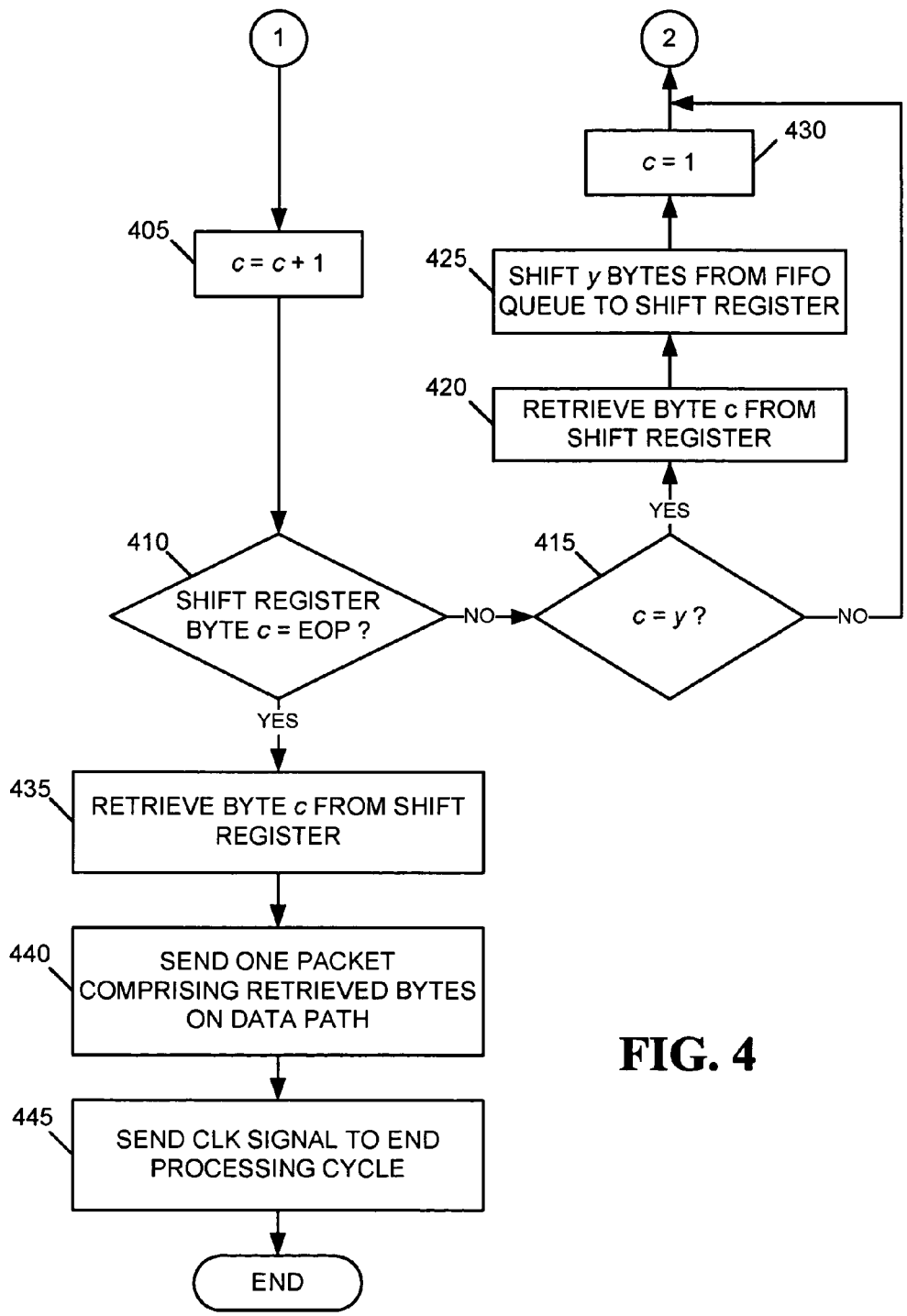

FIGS. 3-4 are exemplary flowcharts of processing by a system, such as packet processing system 100, according to an implementation consistent with the principles of the invention. Processing may begin by sending a clock (CLK) signal to start a processing cycle (step 305). Up to P packets may be received on a N byte data path during the processing cycle defined by the clock signal (step 310). The received packets may be stored in a FIFO queue (step 315). Byte counter c may be set to one (step 320) and it may be determined if byte c of the shift register indicates that it is a first byte of a packet (step 325). For example, byte c may include a start-of-packet (SOP) indicator. If byte c does not include an SOP indicator, the byte counter c may be incremented (step 330), and the process may return to step 325. If the byte c does include an SOP indicator, then byte c may be retrieved from the shift register (step 335).

Turning to FIG. 4, byte counter c may be incremented (c=c+1) (step 405) and it may be determined if byte c in the shift register indicates that it is a last byte of a packet (step 410). For example, the byte may include an end-of-packet (EOP) indicator. If not, then it may be determined whether byte counter c is equal to the byte capacity y of the shift register (step 415). If byte counter c is equal to the maximum byte capacity (y) of the shift register, then byte c may be retrieved from the shift register (step 420) and y bytes may be right shifted from the FIFO queue into the shift register (step 425). Byte counter c may then be reset to one (step 430) and processing may return to step 335. If byte counter c is not equal to the byte storage capacity y of the shift register, then processing may return to step 335.

If byte c of the shift register indicates that it is the last byte of a packet, byte c may be retrieved from the shift register (step 435). A packet may then be sent including the retrieved bytes on a 1 packet/cycle data path (step 440) at, or before, completion of the current processing cycle defined by the clock signal (step 445).

CONCLUSION

Consistent with the principles of the present invention, a data path carrying more than one packet per system cycle may be converted to a data path that carries only Q packets per system cycle, such as 1 packet/cycle. Thus, packet processing may be performed using only a single instance of processing logic, such as CRC logic, to process multiple packets received during a single system cycle.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 3-4, the order of the steps may differ or be performed in parallel in other implementations consistent with the present invention. Use of the "step" in the disclosure is not used in any functional sense, but rather refers to specific acts. Although apparatus, methods and other embodiments consistent with the principles of the invention may process incoming packets and bytes, other units of data may be processed without departing from the spirit and scope of the invention. For example, data entities other then packets can be processed and data units other than bytes can be used to transfer the data entities through the system.

The scope of the invention is defined by the claims and their equivalents.

What is claimed is:

1. A method, comprising:
    storing a first quantity of packets, comprising a plurality of bytes, in a queue;
    shifting a particular quantity of packets, of the first quantity of packets, to a shift register, the particular number of packets being different than the first number of packets;
    determining whether a first byte of the shift register is indicative of a first byte of a packet of the particular quantity of packets;
    determining whether a second byte of the shift register is indicative of a last byte of the packet, based on determining whether the first byte of the shift register is indicative of the first byte of a packet; and
    sending the packet to a device that is to process a maximum quantity of packets that corresponds to the particular quantity of packets per processing cycle, based on determining whether the second byte of the shift register is indicative of the last byte of the packet.

2. The method of claim 1, where determining whether the first byte of the shift register is indicative of the first byte of the packet comprises:
    determining whether the first byte of the shift register includes a start-of-packet indicator.

3. The method of claim 1, where determining whether the second byte of the shift register is indicative of the last byte of the packet comprises:
    determining that the second byte of the shift register includes an end-of-packet indicator.

4. The method of claim 1, further comprising:
    initializing a byte counter prior to determining whether the first byte of the shift register is indicative of the first byte of the packet,
    where the first byte of the shift register corresponds to a first count of the byte counter, and
    where the second byte of the shift register corresponds to a second count of the byte counter.

5. The method of claim 4, further comprising:
    incrementing the byte counter from the first count to the second count when the first byte of the shift register is indicative of the first byte of the packet.

6. The method of claim 4, further comprising:
    determining whether the second count of the byte counter is equal to a maximum byte capacity of the shift register; and
    retrieving the second byte of the shift register,
    where sending the packet includes sending the retrieved second byte of the shift register to the device.

7. The method of claim 1, further comprising:
    retrieving the first byte of the shift register when the first byte of the shift register is indicative of the first byte of the packet,
    where sending the packet includes sending the retrieved first byte of the shift register to the device.

8. The method of claim 1, further comprising:
    retrieving the second byte of the shift register when the second byte is indicative of the last byte of the packet,
    where sending the packet includes sending the retrieved second byte of the shift register to the device.

9. A system, comprising:
    a device to:
        shift a particular quantity of data units, of a first quantity of data units stored in a queue, to a shift register, where the particular quantity is less than the first quantity;
        determine that a first byte of the shift register, corresponding to a first count of a byte counter, is indicative of a first byte of a data unit of the particular quantity of data units;
        retrieve the first byte of the data unit;
        increment the byte counter to a second count after retrieving the first byte of the data unit;
        determine whether a second byte of the shift register, corresponding to the second count, is indicative of a last byte of the data unit; and
        send the data unit to a processing device that processes a maximum number of data units per processing cycle, based on determining whether the second byte of the shift register is indicative of the last byte,
        where the maximum number is equal to the particular quantity of data units.

10. The system of claim 9, where the device is further to:
    determine that the second count of the byte counter is equal to a maximum byte capacity of the shift register;
    retrieve the second byte; and
    shift a quantity of bytes, equal to the maximum byte capacity of the shift register, from the queue to the shift register.

11. The system of claim 9, where, when determining whether the second byte of the shift register is indicative of the last byte of the packet the device is to:
    determine that the second byte of the shift register is indicative of the last byte of the data unit; and
    retrieve the second byte of the packet, and
    where, when sending the data unit to the processing device, the device is to:
        send the data unit, comprising the retrieved first byte and the second byte, to the processing device.

12. The system of claim 9, where, when determining that the first byte of the shift register is indicative of the first byte of the data unit, the device is to:
    determine whether the first byte of the shift register includes a start-of-packet indicator.

13. The system of claim 9, where, when determining whether the second byte of the shift register is indicative of the last byte of the data unit, the device is to:
    determine whether the second byte of the shift register includes an end-of-packet indicator.

14. The system of claim 9, where, when determining whether the second byte of the shift register is indicative of the last byte of the data unit, the device is to:
    determine that the second byte of the shift register is not indicative of the last byte of the data unit;
    determine that the second count of the byte counter is not equal to a maximum byte capacity of the shift register; and
    increment the byte counter when the second count is not equal to the maximum byte capacity of the shift register.

15. The system of claim 14, where the device is further to: retrieve the second byte prior to incrementing the byte counter.

16. A system, comprising:
a queue to:
    store a first quantity of data units, where at least one of the first quantity of data units comprises a plurality of bytes; and
a processing unit to:
    shift a particular quantity of data units from the queue to a shift register,
    where the first quantity of data units is different than the particular quantity of data units;
    determine whether a first byte of the shift register is indicative of a first byte of a data unit of the particular quantity of data units;
    retrieve the first byte based on the determination;
    determine whether a second byte of the shift register is indicative of a last byte of the data unit, after retrieving the first byte;
    send the data unit, comprising retrieved one or more bytes of the data unit, to a device that processes a maximum quantity of data units, corresponding to the particular quantity of data units, per processing cycle.

17. The system of claim 16, where the queue is a First-in-First-Out (FIFO) queue.

18. The system of claim 16, where the first byte of the shift register corresponds to a first count of a byte counter, and
    where the second byte of the shift register corresponds to a second count of the byte counter, and
    where each count of the byte counter is associated with a capacity of the shift register.

19. The system of claim 16, where the processing unit is further to:
    determine that the second byte of the shift register is not indicative of the last byte of the data unit,
    retrieve the second byte based on determining that the second byte of the shift register is not indicative of the last byte,
    determine that a third byte of the shift register is indicative of the last byte of the packet, after retrieving the second byte, and
    retrieve the third byte based on determining that the third byte of the shift register is indicative of the last byte,
    where, when sending the data unit, the processing unit is to send the retrieved first byte, the retrieved second byte, and the retrieved third byte.

20. The system of claim 16, where the particular quantity of data units is less than the first quantity of data units.

* * * * *